US012691027B1

(12) United States Patent
Hess et al.

(10) Patent No.: US 12,691,027 B1
(45) Date of Patent: Jul. 28, 2026

(54) SYSTEM FOR ADAPTING TEXT FOR IMPROVING BINOCULAR FUNCTION AND METHOD OF USE THEREOF

(71) Applicant: The Royal Institution for the Advancement of Learning/McGill University, Montreal (CA)

(72) Inventors: Robert Hess, Montreal (CA); Alexandre Reynaud, Montreal (CA); Alexander Scott Baldwin, Vaudreuil-Dorion (CA)

( * ) Notice: Subject to any disclaimer, the term of this patent is extended or adjusted under 35 U.S.C. 154(b) by 533 days.

(21) Appl. No.: 18/319,692

(22) Filed: May 18, 2023

Related U.S. Application Data

(60) Provisional application No. 63/343,307, filed on May 18, 2022.

(51) Int. Cl.
 *A61H 5/00* (2006.01)
 *H04N 13/327* (2018.01)
(52) U.S. Cl.
 CPC ........... *A61H 5/005* (2013.01); *H04N 13/327* (2018.05)
(58) Field of Classification Search
 CPC ...... A61H 5/005; H04N 13/327; A61B 3/032; A61B 3/08; A61B 3/085

USPC ......................................... 351/201, 202, 203
 See application file for complete search history.

(56) References Cited

U.S. PATENT DOCUMENTS

| 8,057,036 B2 | 11/2011 | Hess et al. | |
| 2018/0311103 A1* | 11/2018 | Succar | A61H 5/005 |

FOREIGN PATENT DOCUMENTS

| CN | 110652431 A | * | 1/2020 | G16H 20/30 |
| WO | WO-2019100165 A1 | * | 5/2019 | A61F 9/00 |

* cited by examiner

*Primary Examiner* — Bumsuk Won
*Assistant Examiner* — Alex Park Rickel
(74) *Attorney, Agent, or Firm* — Anglehart et al.

(57) ABSTRACT

A method of adapting a text for improving binocular function; it includes converting or classifying the string of characters into a first set of parts, a second set of parts and a third set of parts; adapting the string of characters into one or two dichoptic display strings configured to present the first set of parts strings to a first eye of the subject, to present the second set of parts to a second eye of the subject, and to present the third set of parts to both the first eye and the second eye; and causing a setting of a relative luminance contrast between the first set of parts, the second set of parts and the third set of parts for allowing a subject to perceive the first set of parts using the first eye and perceive the second set of parts using the second eye.

20 Claims, 11 Drawing Sheets

On the Great Plains, the Cree or Nhilaw (who spoke a closely related Central Algonquian language, the plains Cree language) depended on the vast herds of bison to supply food and many of their other needs.

On the Great Plains, the Cree or Nhilaw (who spoke a closely related Central Algonquian language, the plains Cree language) depended on the vast herds of bison to supply food and many of their other needs.

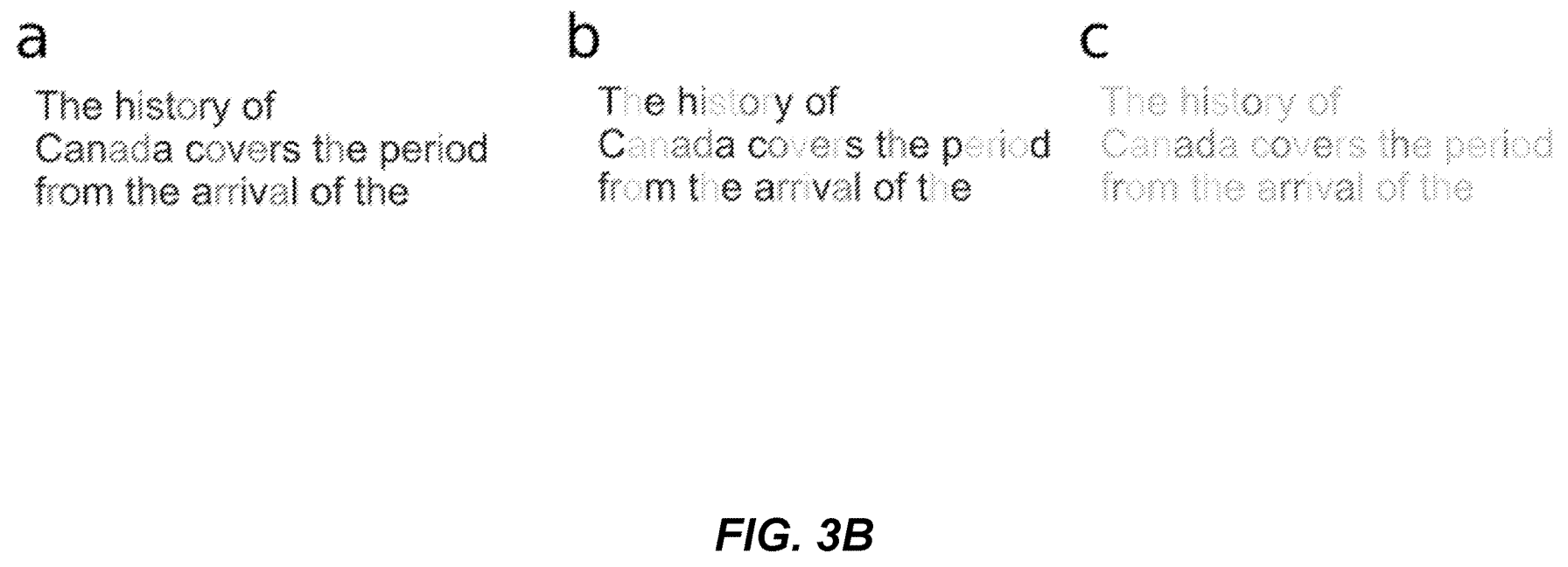

a

The history of
Canada covers the period
from the arrival of the b

The history of
Canada covers the period
from the arrival of the c

The history of
Canada covers the period
from the arrival of the

*FIG. 3B*

Hello! How are you today?

Hello

SYSTEM FOR ADAPTING TEXT FOR IMPROVING BINOCULAR FUNCTION AND METHOD OF USE THEREOF

The present application claims priority from U.S. provisional patent application No. 63/343,307 filed on May 18, 2022, incorporated herein by reference.

TECHNICAL FIELD

The present disclosure relates to treatments for visual disorders, and more particularly to treatments for improving binocular function of a subject.

BACKGROUND

Certain visual disorders or injuries result in a subject not being able to see binocularly (where the subject cannot see with both eyes synergistically). Such disorders include, but are not limited to amblyopia, dissociated visual disorder, eye misalignment, etc. Injuries, e.g., from surgical interventions, affecting the alignment of the eyes of the subject, may also affect the subject's ability to see binocularly. Moreover, any brain or eye trauma, e.g. traumatic brain injury, can cause either loss of binocular vision (i.e. single vision) or diplopia (i.e. double vision).

In order to train a subject to view binocularly, certain treatments have been devised, for instance, as described in U.S. Pat. No. 8,057,036, specifically directed to the treatment of amblyopia, where a dominant eye overpowers a weaker eye, resulting in the suppression of the weaker eye by the dominant eye.

Moreover, certain technologies have attempted to modify text to improve a subject's binocular vision. Examples of such treatments include, for instance, LAZY EYE TRAIN-ING™, Ant-Suppression Games for Amblyopia, where a first portion of text is presented to one eye, a second portion of text is presented to a second eye and a third portion of text is seen by both eyes. However, such a form of treatment does not account for a relative strength between the two eyes, in other words any resident left/right eye imbalance in the connections in the brain, and achieves limited used in gradually training the subject to regain binocular function.

Therefore, an effective method of altering text to improve binocular function (sensory or motor) of a subject is sought.

SUMMARY

The present disclosure relates to a system for and a method of modifying a text in order to improve sensory or motor binocular vision of a subject, e.g. thereby treating a visual disorder affecting binocular vision of the subject.

In addition to presenting a first set of parts of the text to one eye, a second set of parts of the text to a second eye, and a third set of parts of the text to both eyes, a relative luminance contrast between the first set of parts of the text, the second set of parts of the text and the third set of parts of the text is determined in order, e.g., to account for the relative difference in strength between the eyes of the subject. This allows the left/right eye imbalance to be accounted for so that at the point of combination of the two eye's inputs in the brain, their strengths will be equal, producing a balanced combination. The use of a dichoptic presentation where each eye only sees a part of the image text ensures that for reading text both eyes are operating because under ordinary binocular viewing the information from one eye can be suppressed and this will not be apparent to either the subject or the practitioner. In preferred embodiments, the relative luminance contrast is also applied to the third set of parts (i.e. that are configured to be seen by both eyes), otherwise the third set of parts can interfere with the ability of the subject to perceive the first set of parts and the second set of parts, even when the luminance contrast is adjusted between the first set of parts and the second set of parts.

The text is composed from the first set of parts, the second set of parts and the third set of parts. The first set of parts is adapted to be presented to a first eye of the subject. The second set of parts is adapted to be presented to a second eye of the subject. The third set of parts can be seen by both eyes of the subject, providing the subject with common information perceivable by both eyes. As such, the first eye captures only a portion of the text, where the text presented to the second eye captures complementary text to that presented to the first eye, and with the text presented binocularly, completing the full text. Therefore, the subject is only capable of reading the complete text if the subject is seeing binocularly, i.e. perceiving and merging the information captured by both eyes.

However, in order to encourage the binocular function of the subject, a relative luminance contrast between the first set of parts, the second set of parts and the third set of parts is determined and set. As the subject's binocular vision improves, the relative luminance contrast is gradually adjusted (e.g. reduced) until the subject is capable of seeing binocularly with a relative luminance contrast of "1", where the luminance contrasts of the three sets of parts are equal. This is equivalent to natural viewing.

In some embodiments, a size of the dichoptic scale between the first set of parts, the second set of parts and the third set of parts is determined. By dichoptic scale, it is meant the granularity of the size of each unitary part. For instance, a larger size of dichoptic scale would result in part of the set of parts to be that of a group of words of the texts, then words of the text. In contrast, a finer dichoptic scale would be separation between the characters of the text, or parts of characters of the text. The dichoptic scale relates to the size of the parts that are interchanging to constitute the text. For instance, when the dichoptic scale is set as characters, the parts of the text are characters, where words of the text may include characters from the first set of parts, the second set of parts and the third set of parts. When a patient is afflicted with a more serious visual disorder and has therefore a more significant loss of binocular function, be it either sensory (i.e. visual loss) or motor (e.g. eye misalignment), a larger size of dichoptic scale may be appropriate. However, as the patient's binocular function, be it either sensory or motor improves and/or if the patient has milder visual disorder resulting in less of a loss of binocular function, a smaller size may be selected for dichoptic scale as explained herein.

A text may be adapted by determining a relative luminance contrast of the first set of parts, the second set of parts and the third set of parts, and/or by selecting an appropriate size of coarseness of separation.

A broad aspect is a method of adapting a text for viewing in digital or printed form for improving binocular function be it either sensory or motor, the text comprising a string of characters. The method includes converting or classifying the string of characters into a first set of parts, a second set of parts and a third set of parts; adapting the string of characters into one or two dichoptic display strings configured to present the first set of parts strings to a first eye of the subject, to present the second set of parts to a second eye of the subject, and to present the third set of parts to both the first eye and the second eye; and causing a setting of a relative luminance contrast between the first set of parts, the second set of parts and the third set of parts for allowing a subject, wherein a luminance contrast is a luminance decrement of the first set of parts, the second set of parts or the third set of parts with respect to a luminance background, to perceive the first set of parts using the first eye and perceive the second set of parts using the second eye, whereby the subject can read the text binocularly and whereby the reading of the text, perceiving the first set of parts, second set of parts and third set of parts, improves the visual disorder.

In some embodiments, the text may be generated on a flat display of the computer.

In some embodiments, the adapting may be the result of the use of anaglyph images, wherein the first set of parts may be in a first colour and the second set of parts may be in a second colour, and whereby the first eye of the user may be presented with a filter for the first colour enabling the first set of parts to be presented to the first eye of the subject, and the second eye of the user may be presented with a filter for the second colour enabling the second set of parts to be presented to the second eye of the subject, such that the user does not perceive a difference in colour in the string of characters while reading the text.

This may be achieved by presenting the different coloured letters on a lighter background such that the letters are perceived as dark against the lighter background because the filter over that eye is the opposite colour to that of the letter, thereby totally blocking it from being transmitted (hence seen as dark against the light background)

In some embodiments, the background may be lighter to allow the adjustment of the relative luminance contrast.

In some embodiments, the improving of the binocular function of the subject may be to treat the sensory disorder amblyopia.

In some embodiments, the improving of the binocular function of the subject may be to treat the sensory-motor dissociated visual disorders.

In some embodiments, the improving of the motor binocular function (i.e. eye alignment) of the subject may be to treat the sensory disorder strabismus, either pre- or post-surgery.

In some embodiments, the method may include receiving the text for display on the computer; and generating the one or two dichoptic string displays on one or two computer displays.

In some embodiments, the converting or classifying may include performing optical character recognition on the text to identify the string of characters prior to the adapting.

In some embodiments, the received text may be for display in a video game.

In some embodiments, the received text may be for display as a digital book.

In some embodiments, the text may be printed on stationery.

In some embodiments, the causing a setting of a relative contrast between the first set of parts, the second set of parts and the third set of parts may be performed by adjusting pixels of the background surrounding the first set of parts, the second set of parts and the third set of parts.

In some embodiments, the causing a setting of a relative contrast between the first set of parts, the second set of parts and the third set of parts may be performed by modifying contrast of only the first set of parts with respect to the background.

In some embodiments, the adapting may be achieved through polarization such that light associated with the first set of parts may be restricted to a first direction, and light associated with the second set of parts is restricted to a second direction.

In some embodiments, the adapting may be achieved through polarization or related optical means (e.g. dichroic filtering) such that light associated with the first set of parts may be restricted to a first direction, and light associated with the second set of parts is restricted to a second direction. In this example, the dichoptic presentation is not achieved by text of different colour but instead through use of a direction of the wavelengths of light.

In some embodiments, the parts of the first set of parts may be characters, the parts of the second set of parts may be characters, and the parts of the third set of parts may be characters.

In some embodiments, the parts of the first set of parts are words, the parts of the second set of parts are words, and the parts of the third set of parts may be words.

In some embodiments, the parts of the first set of parts may be portions of words or characters, the parts of the second set of parts may be portions of words or characters, and the parts of the third set of parts may be portions of words or characters.

In some embodiments, the method may include adjusting the dichoptic scale by decreasing coarseness of separation between the interchanging of the first set of parts, the second set of parts and the third set of parts by having the parts of the first set of parts, the second set of parts, and the third set of parts transition from words to characters and to fragments of characters as the visual disorder of the subject improves.

Another broad aspect is a method of adapting a text for viewing in digital or printed form for improving binocular function of a subject, the text comprising a string of characters. The method includes converting or classifying the string of characters into a first set of parts, a second set of parts and a third set of parts; adapting the string of characters into one or two dichoptic display strings configured to present the first set of parts strings to a first eye of the subject, to present the second set of parts to a second eye of the subject, and to present the third set of parts to both the first eye and the second eye; and causing a setting of a dichoptic scale of the interchanging of the first set of parts, the second set of parts and the third set of parts by selecting a coarseness of separation of the interchanging, where an increased coarseness results in the parts of the first set of parts, the second set of parts and the third set of parts being words, and a reduced coarseness results in the parts of the first set of parts, the second set of parts and the third set of parts being characters, whereby the subject can read the text binocularly and whereby the reading of the text, perceiving the first set of parts, second set of parts and third set of parts, improves the binocular function of the subject.

In some embodiments, a further reduced coarseness may result in the parts of the first set of parts, the second set of parts and the third set of parts being fragments of characters.

In some embodiments, the fragments of characters may be divided in a manner to reduce a capacity of the subject to determine an identity of the character of a fragment of the fragment of characters without perceiving a whole of the character.

In some embodiments, the text may be generated on the display of a computing device.

In some embodiments, wherein adapting the string of characters into one or two dichoptic display strings may include presenting the first set of parts strings to a first eye of the subject, to present the second set of parts to a second eye of the subject, and to present the third set of parts to both the first eye and the second eye may be through use of anaglyph images wherein the first set of parts may be in a first colour and the second set of parts may be in a second colour, and whereby the first eye of the user may be presented with a filter for the first colour enabling the first set of parts to be presented to the first eye of the subject, and the second eye of the user may be presented with a filter for the second colour enabling the second set of parts to be presented to the second eye of the subject, such that the user does not perceive a difference in colour in the string of characters while reading the text.

In some embodiments, the background may be white to enable the adjustment of the relative luminance contrast.

In some embodiments, the improving of the binocular function of the subject may be to treat amblyopia.

In some embodiments, the improving of the binocular function of the subject may be to treat a dissociated visual disorder.

In some embodiments, the improving of the binocular function of the subject may be to treat an eye-misalignment In some embodiments, the improving of the binocular function of the subject may be to treat an over or under convergence (convergence insufficiency or convergence excess).

In some embodiments, the generating of the text may include receiving the text for display on the computer; and generating the one or two dichoptic string displays on one or two computer displays.

In some embodiments, the converting or classifying may include performing optical character recognition on the text to identify the string of characters prior to the adapting.

In some embodiments, the received text may be for display in a video game.

In some embodiments, the received text may be for display as a digital book.

In some embodiments, the text may be printed onto stationery.

In some embodiments, the method may include setting a relative luminance contrast between the first set of parts, the second set of parts and the third set of parts by adjusting pixels of the background surrounding the first set of parts, the second set of parts and the third set of parts.

In some embodiments, the method may include setting a relative luminance contrast between the first set of characters, the second set of characters and the third set of characters by modifying contrast of only one, two or the three sets of characters with respect to the background.

In some embodiments, the adapting may be achieved through polarization or other related optical means (i.e. dichroic filtering) such that light associated with the first set of parts is restricted to a first set of filter, and light associated with the second set of parts may be restricted to a second set of filter.

In some embodiments, the adapting may be achieved through a lenticular means or other related optical means (i.e. prisms, head mounted display) to restrict light associated with the first set of parts emitted to a first direction, and to restrict the light associated with the second set of parts to a second direction.

Another broad aspect is a system for adapting a text for viewing in digital or printed form for treating a subject afflicted with a visual disorder, the text comprising a string of characters. The system includes a processor; memory including program code that, when executed by the processor, cause the processor to: convert or classify the string of characters into a first set of parts, a second set of parts and a third set of parts; adapt the string of characters into one or two dichoptic display strings configured to present the first set of parts strings to a first eye of the subject, to present the second set of parts to a second eye of the subject, and to present the third set of parts to both the first eye and the second eye; and cause a setting of a relative luminance contrast between the first set of parts, the second set of parts and the third set of parts for allowing a subject to perceive the first set of parts using the first eye and perceive the second set of parts using the second eye, whereby the subject can read the text binocularly.

Another broad aspect is a system for adapting a text for viewing in digital or printed form for treating a subject afflicted with a visual disorder, the text comprising a string of characters. The system includes a processor; memory including program code that, when executed by the processor, cause the processor to convert or classify the string of characters into a first set of parts, a second set of parts and a third set of parts; adapt the string of characters into one or two dichoptic display strings configured to present the first set of parts strings to a first eye of the subject, to present the second set of parts to a second eye of the subject, and to present the third set of parts to both the first eye and the second eye; and cause a setting of a dichoptic scale of the interchanging of the first set of parts, the second set of parts and the third set of parts by selecting a coarseness of separation of the interchanging, where an increased coarseness results in the parts of the first set of parts, the second set of parts and the third set of parts being words, and a reduced coarseness results in the parts of the first set of parts, the second set of parts and the third set of parts being characters, whereby the subject can read the text binocularly and whereby the reading of the text, perceiving the first set of parts, second set of parts and third set of parts, improves the visual disorder.

Another broad aspect is a non-transitory storage medium comprising program code that are executable by a processor to convert or classify the string of characters into a first set of parts, a second set of parts and a third set of parts; adapt the string of characters into one or two dichoptic display strings configured to present the first set of parts strings to a first eye of the subject, to present the second set of parts to a second eye of the subject, and to present the third set of parts to both the first eye and the second eye; and cause a setting of a relative luminance contrast between the first set of parts, the second set of parts and the third set of parts for allowing a subject to perceive the first set of parts using the first eye and perceive the second set of parts using the second eye, whereby the subject can read the text binocularly.

Another broad aspect is a non-transitory storage medium comprising program code that are executable by a processor to convert or classify the string of characters into a first set of parts, a second set of parts and a third set of parts; adapt the string of characters into one or two dichoptic display strings configured to present the first set of parts strings to a first eye of the subject, to present the second set of parts to a second eye of the subject, and to present the third set of parts to both the first eye and the second eye; and cause a setting of a dichoptic scale of the interchanging of the first set of parts, the second set of parts and the third set of parts by selecting a coarseness of separation of the interchanging, where an increased coarseness results in the parts of the first set of parts, the second set of parts and the third set of parts being words, and a reduced coarseness results in the parts of the first set of parts, the second set of parts and the third set of parts being characters, whereby the subject can read the text binocularly and whereby the reading of the text, perceiving the first set of parts, second set of parts and third set of parts, improves the visual disorder.

A method of adapting a text for viewing in digital or printed form for improving the motor binocular function of a subject, the text comprising a string of characters. In this case, all or part of the text is displayed in a depth plane either in front or behind the plane of the medium for displaying the text (e.g. a computer screen or handheld digital display). The former would be used to provide a strong convergence cue to treat cases of convergences insufficiency, the latter to treat convergence excess by providing conditions where the eyes are encouraged to diverge relative to the computer or digital display screen. The method includes converting or classifying the string of characters into a first set of parts, a second set of parts and a third set of parts; adapting the string of characters into one or two dichoptic display strings configured to present the first set of parts strings to a first eye of the subject, to present the second set of parts to a second eye of the subject, and to present the third set of parts to both the first eye and the second eye; and causing a setting of a lateral separation of one of the parts of the third set of parts; the characters of the text; and the words of the text, whereby the subject can read the text binocularly and whereby the reading of the text, perceiving the first set of parts, second set of parts and third set of parts, improves the motor convergence function of the subject.

Another broad aspect is a system for adapting a text for viewing in digital or printed form for improving motor or sensory-related binocular function, the text comprising a string of characters. The system includes a processor; memory including program code that, when executed by the processor, cause the processor to convert or classifying the string of characters into a first set of parts, a second set of parts and a third set of parts; adapt the string of characters into one or two dichoptic display strings configured to present the first set of parts strings to a first eye of the subject, to present the second set of parts to a second eye of the subject, and to present the third set of parts to both the first eye and the second eye; and cause a setting of a lateral separation of one of the parts of the third set of parts; the characters of the text; and the words of the text, whereby the subject can read the text binocularly and whereby the reading of the text, perceiving the first set of parts, second set of parts and third set of parts, improves the motor convergence function of the subject.

BRIEF DESCRIPTION OF THE DRAWINGS

The invention will be better understood by way of the following detailed description of embodiments of the invention with reference to the appended drawings, in which:

FIG. 3B is a drawing illustrating exemplary different relative luminance contrasts between the first set of parts, the second set of parts, and the third set of parts;

FIG. 5 is a drawing of exemplary strings of characters and character, where there is a gradual decrease in the size of the coarseness of separation between the sets of parts of the text from top to bottom;

DETAILED DESCRIPTION

Figure 1:
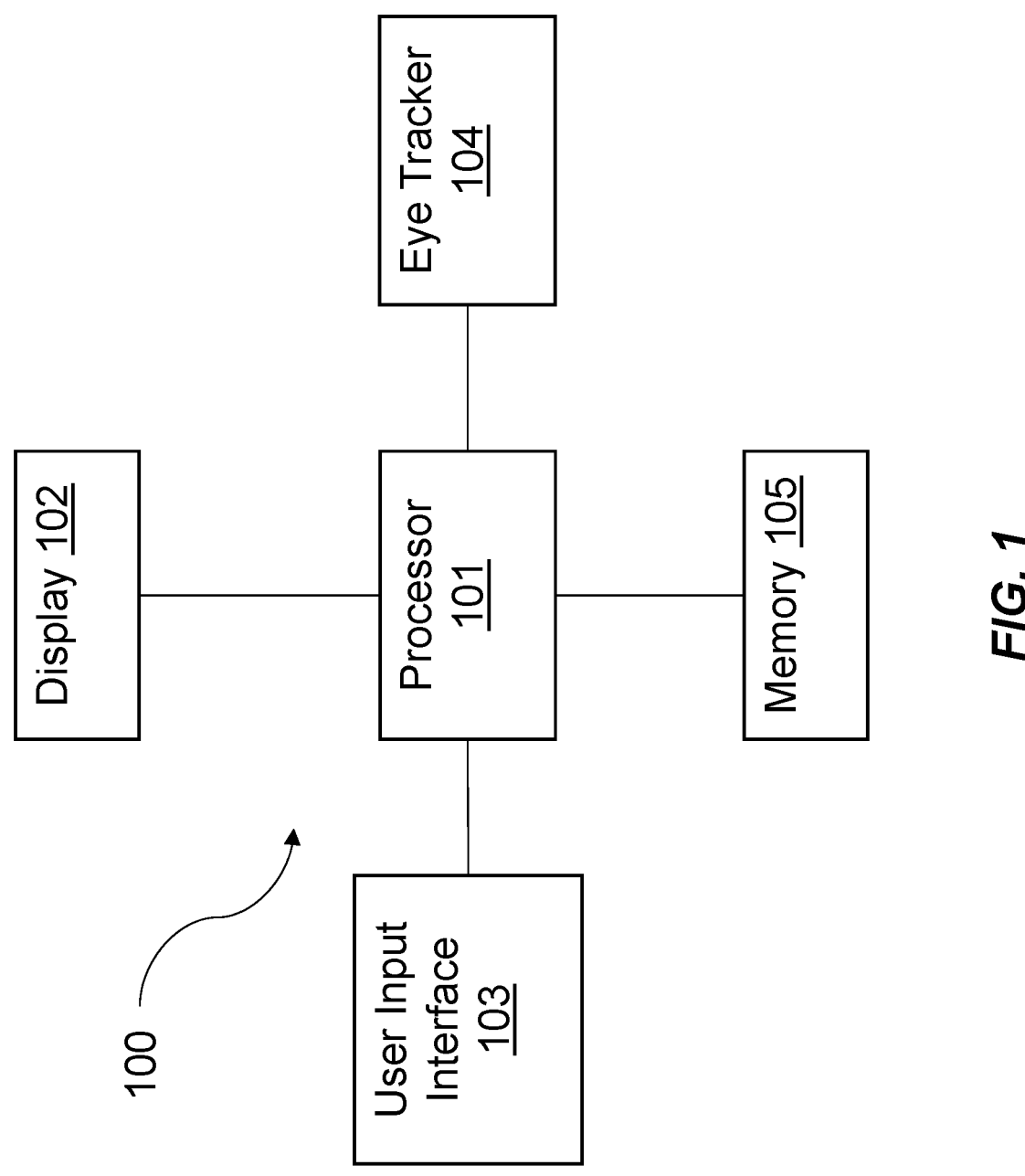
FIG. 1 is a block diagram of exemplary hardware of an exemplary system for adapting a text for improving binocular function.

The present disclosure relates to a system for adapting a text for purposes of rehabilitation (treating) of a subject with a visual disorder affecting the sensory or motor binocular vision of a subject. The system classifies the text into three sets of parts: a first set of parts, a second set of parts and a third set of parts. The parts of each of the sets of parts are distinct from one-another, such that there is no overlap. The combination of the three sets of parts results in the text.

The first set of parts is adapted to be presented to a first eye and the second set of parts is adapted to be presented to a second eye. The adaptation of the first set of parts and the second set of parts may be achieved from the application of an effect, such as by colour-coding the parts, where the colour-coding is complementary with anaglyphic, through the use of polarization, through the use of a lenticular device, through the use of a dichroic device, through the use of any optical or electronic means, etc. In some examples, the adaptation may be by presenting the first set of parts on a first display, and the second set of parts on a second display, where the first display is to be presented to a first eye and the second display is to be presented to both eyes. The third set of parts is to be presentable to both eyes (e.g. not affected by the effect, or appears on both displays for presenting to both eyes but presented to each eye at the required luminance contrast imbalance so that it can be easily combined binocularly).

The dichoptic separation of information between the two eyes can be static or dynamic. In the latter case, the exact words/characters/parts of letters what are seen by one eye or the other can be dynamically changed.

Following one broad aspect, a relative luminance contrast between the first set of parts, the second set of parts and the third set of parts to be seen by both eyes is adjusted to a value where the subject is seeing binocularly (i.e. using both eyes), which can be tested by verifying if the subject can read the entire text.

In another broad aspect, distinct from or complementary with the previous broad aspect of the relative luminance contrast, a dichoptic scale of the coarseness of the separation between the parts of the first set of parts, second set of parts and third set of parts in the text is set at a level where the subject is functioning binocularly (i.e. is capable of reading the entire text composed of the three sets of parts).

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

From the foregoing it will be appreciated that, although specific embodiments have been described herein for purposes of illustration, various modifications may be made without deviating from the spirit and scope of the teachings. Accordingly, the claims are not limited by the disclosed embodiments.

Definitions

In the present disclosure, by "coarseness of separation" or "size of coarseness of separation", it is meant the size of the parts of the sets that interchange to constitute the text to result in dichoptic scale. A greater coarseness of separation means that more of the text constitutes each part, where a small coarseness signifies that less of the text constitutes each part. For instance, an exemplary list of sizes in coarseness separation from a great size of coarseness separation to lesser size of coarseness separation may be: "groups of words; words; groups of characters; characters; fragments of characters." The selected coarseness of selection defines the dichoptic scale of the text.

In the present disclosure, by "dichoptic scale", it is meant the granularity of division between the parts that are to be viewed by the first eye and the parts to be viewed by the second eye. When the size of the dichoptic scale is smaller, resulting in finer separation, so will the average distance between parts of a same set be shorter.

In the present disclosure, by "luminance contrast", it is meant a luminance decrement of the parts with respect to the luminance of the background, and can be defined as "$\Delta i/i$".

In the present disclosure, by "parts", it is meant the units that alternate between the first set, the second set and the third set to constitute the text to be read binocularly by the subject. The size or value of each part depends upon the coarseness of separation when alternating the parts, and can be, for instead, a group of words, a single word, a character or group of characters, a fragment of a character, etc. Each part of one set may be neighboured by parts of one or more different sets. In some examples, each part of one set may also be neighboured by a part from the same set of parts.

In present disclosure, by "relative luminance contrast" it is meant the difference in luminance contrast between the first set of parts, the second set of parts and the third set of parts, and can be quantified as a ratio of luminance contrast between the first set of parts and the second set of parts.

In the present disclosure, by "subject", it is meant a human. The term "subject" should not bring on any limitations as to the sex or age. A subject seeks to improve binocular function (e.g. has a loss of binocular function resulting from, e.g., a visual disorder, or injury affecting the subject's binocular function). The subject may be self-treating using the system and/or method described herein, or treating under the supervision of a physician using the system and/or method described herein.

In the present disclosure, by "treating" or "treatment", it is meant the act of performing a task for the purpose of improving binocular function that may have been lost due to condition of the patient, such as an injury, a disease, a disorder, etc.

In the present disclosure, by "text" it is meant the string of characters that is to be read binocularly by the subject. A text can be on a printed medium (e.g. stationery), portrayed on a computer display, on two complementary displays to be viewed binocularly (e.g. virtual-reality headset), presented in a 3D medium (e.g. a hologram), etc.

Exemplary System for Adapting a Text for Treating a Visual Disorder Affecting Binocular Vision:

Reference is now made to FIG. 1, illustrating an exemplary system 100 for adapting a text for improving binocular vision. The adapted text can then be printed onto stationery, displayed on a screen, etc.

The system 100 has a processor 101 and memory 105. The system 100 may have a display 102, a user input interface 103 and/or an eye tracker 104.

The memory 105 may contain program code for execution by the processor 101. Therefore, the memory 105 stores program instructions and data used by the processor 101. The computer readable memory 105, though shown as unitary for simplicity in the present example, may comprise multiple memory modules and/or cashing. In particular, it may comprise several layers of memory such as a hard drive, external drive (e.g. SD card storage) or the like and a faster and smaller RAM module. The RAM module may store data and/or program code currently being, recently being or soon to be processed by the processor 101 as well as cache data and/or program code from a hard drive.

The processor 101 is a general-purpose programmable processor. In this example, the processor 101 is shown as being unitary, but the processor may also be multicore, or distributed (e.g. a multi-processor). The processor 101 may be a micro-processor.

The user input interface 103 is an interface that allows the subject to provide specific input, such as buttons to allow a subject to select a text to read, provide input that the subject is viewing binocularly, etc. For instance, the user input interface 103 may be one or more of a keyboard, a joystick, a controller, a touchpad, a microphone combined with a voice processor, a movement detector, etc. In some examples, the user input interface 103 may also provide for an option for the subject to control the image parameters. In other examples, the image parameters may be controlled by a supervising physician.

In some examples, the memory 105 stores the program code for an add-on that can be used with an application program running on the computer that displays text (e.g. a web browser, a game, an e-reader such as KINDLE™, etc.) The program code may also include the instructions to adapt the text such that the first set of parts is viewed by a first eye of the subject and the second set of parts is viewed by a second eye of the subject.

The display 102 is a display that is used to present the text to the user. In some examples, the display 102 may be used with a piece of equipment, such as anaglyphic glasses (where the adapted text displayed on display 102, when viewed with the anaglyphic glasses, causes the first set of parts to be viewable by the first eye and the second set of parts to be viewable by the second eye). Another exemplary piece of equipment is polarized lenses, for restricting light to be perceived by an eye of the subject based on the orientation of the light, when the light associated with a first set of parts is polarized in one direction, and the second set of parts is polarized in another direction. The display 102 may be, in some examples, a virtual reality headset, a headset display, augmented reality glasses such as Vuzix Blade AR Glasses, the screen of a portable computing device such as a tablet or smartphone, a desktop display, a television set, etc. In some instances, the display 102 may include two screens, one for each eye, such as in the case of a virtual reality headset, for presenting on a first screen the first set of parts and the third set of parts for viewing by the first eye, and for presenting on the second screen the second set of parts and the third set of parts for viewing by the second eye. The display 102 may have a wired connection to the processor 101.

In some examples, the system 100 may also include an eye tracker 104 to verify the relative position of one eye with respect to the other.

The eye tracker 104 may include a camera that can capture images or an image stream of the face (or at least the eyes) of the patient, and may include an application program stored in memory 105 of the system 100 that, when executed by the processor 101, uses the captured images or image stream to determine the eye position and/or the eye movement of each of the eyes.

The memory 105 and the processor 101 may have a BUS connection. The user input interface 103 may be connected to the processor via a wired connection.

The system 100 may be that of a computing device (e.g. desktop computer, tablet computer, smartphone, laptop, virtual-reality headset, etc.)

Figure 2:
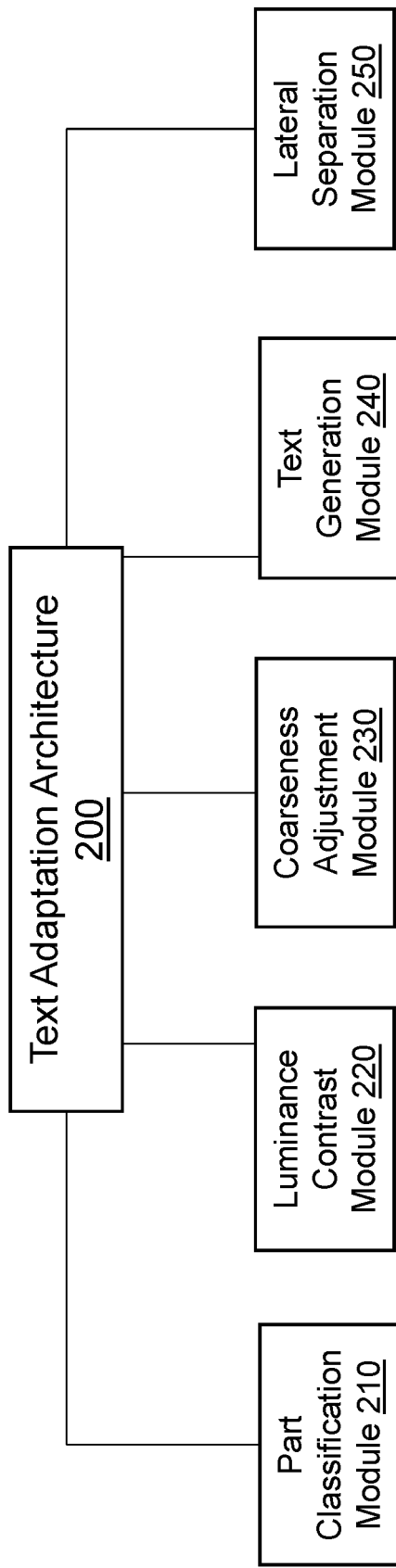
FIG. 2 is a block diagram of exemplary software architecture of an exemplary system for adapting a text for improving binocular function.

Exemplary Software Architecture of a System for Adapting Text for Improving Binocular Function of a Subject:

Reference is now made to FIG. 2, illustrating an exemplary text adaptation architecture 200 of system 100. In one example, the text adaptation architecture 200 may be stored in memory 105.

The text adaptation software architecture 200 includes a part classification module 210 and a text generation module 240. The text adaptation software architecture 200 includes a contrast luminance module 220 and/or a coarseness adjustment module 230 and/or a lateral separation module 250.

The text adaptation software architecture 200 receives a text to be adapted for visual disorder treatment, classifies the parts of the text into three sets, adapts the sets of parts for perception by their respective eye, and generates a command to display the adapted text.

The part classification module 210 includes program code that, when executed by the processor 101, causes the processor 101 to receive a text to be adapted and applies a function to classify the parts of the text into three distinct sets: a first set of parts, a second set of parts and a third set of parts. The processor 101 is further caused to apply a first effect to a first set of parts and apply a corresponding second effect to a second set of parts, where the first effect and the corresponding second effect are for limiting the first set of parts to be viewed by a first eye and the second set of parts to be viewed by the second eye.

The contrast luminance module 220 includes program code that, when executed by the processor 101, causes the processor 101 to receive the classified sets of parts and to measure a relative luminance contrast between the first set of parts, the second set of parts and the third set of parts. The program code may then cause the processor 101 to calibrate the relative luminance contrast, by altering the luminance contrast of the first set of parts and/or the second set of parts and/or the third set of parts, until the subject is capable of viewing the first set of parts and the second set of parts, seeing binocularly. The relative luminance contrast may be set through the receipt of user feedback during a calibration of the system.

The coarseness adjustment module 230 includes program code that, when executed by the processor 101, causes the processor 101 to receive the classified sets of parts, and to set a dichoptic scale by adjusting a coarseness of separation for the sets of parts, where the coarseness separation that is set enables the subject to view the first set of parts and the second set of parts, the subject seeing binocularly. The coarseness of separation may be set through the receipt of user feedback during a calibration of the system.

The text generation module 240 includes program code that, when executed by the processor 101, causes the processor 101 to receive the adapted text (either from the luminance contrast module 220 or the part classification module 210) and issues a command to generate the adapted text for viewing by the user (e.g. to be displayed on display 102; to be printed on paper; etc.)

The lateral separation module 250 includes program code that, when executed by the processor 101, causes the processor 101 to receive the classified sets of parts or the text, and to set a lateral separation by adjusting a lateral or horizontal separation between the parts of the text, the characters of the text or the words of the text, where the lateral separation that is set is to place the text so it is perceived at a depth either in front or behind the display screen improve a subject's convergence (either strengthen it in cases of convergence insufficiency or weaken it in cases of convergence excess). In some instances, the lateral separation may be set through the receipt of user feedback or user input. In some embodiments, the lateral separation of the text may gradually shift over time, where the lateral separation of the text may cyclically increase then decrease (or decrease then increase) over time.

The text adaptation software architecture 200 may be an add-on to be used with an application program running on the computing device of the subject. In other examples, the text adaptation software architecture 200 may be integrated into the application program running on the computing device that generates the text to be displayed. It will be understood that the text adaptation software architecture 200 may be implemented in other manners for adapting a text that is to be presented to the subject, provided the subject is shown that has received the text adaptation as described herein.

Figure 6:
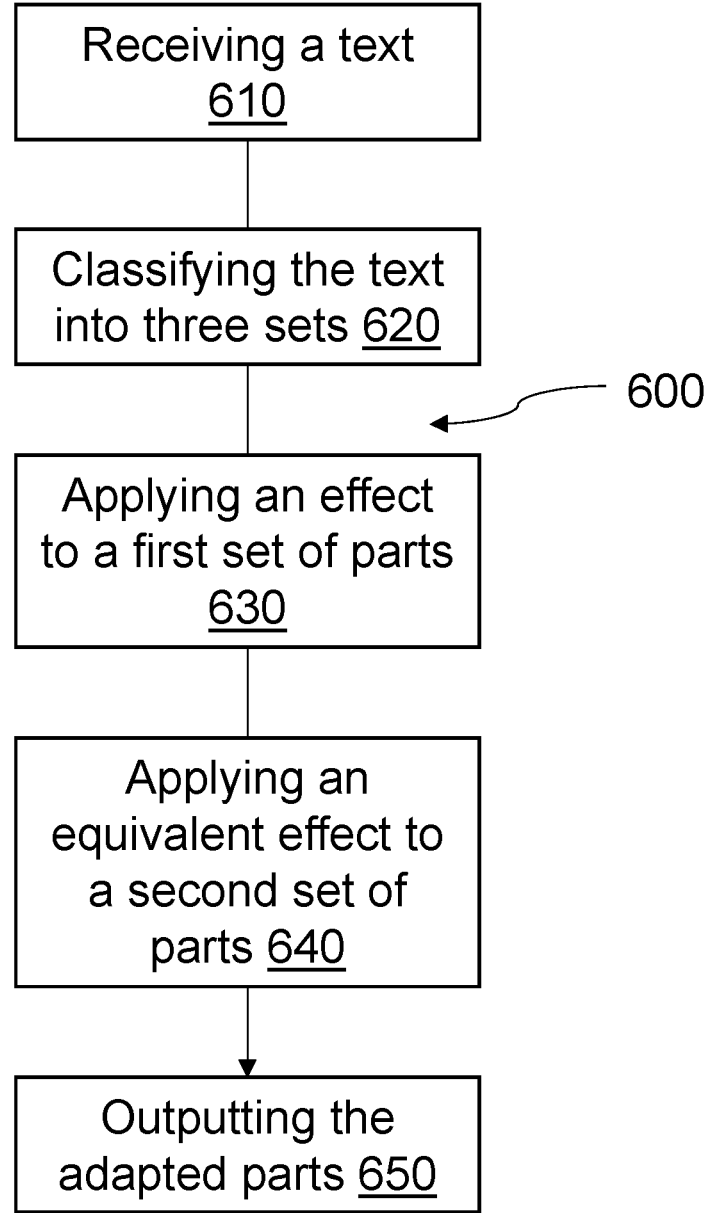
FIG. 6 is a flowchart diagram of an exemplary method of classifying parts of a text into three sets.

Exemplary Method of Classifying Parts of a Text Performed by the Part Classification Module:

Reference is now made to FIG. 6, illustrating an exemplary method 600 of classifying parts of a text using a parts classification module. For purposes of illustration, reference will be made to parts classification module 210 and to text adaptation software architecture 200. However, it will be understood that any parts classification module and text adaptation software architecture in accordance with the present teachings may be used.

A text is received at step 610. When the text adaptation software architecture 200 is an add-on to be used with an application program running on the computing device of the subject, the received text may be then generated by the application program, the text information first transmitted to the parts classification module 210 for starting the adaptation process of the text.

The received text may be subject to optical character recognition to identify the characters appearing in the text. In some examples, the text may be parsed to identify the constituents of the text.

The received text is then divided into parts. The parts are classified into three sets at step 620. In the embodiments where a coarseness separation is set, the text classification module 210 calls the coarseness adjustment module 230 after step 610, and before step 620 for determining the appropriate size of the parts composing the sets of parts. The division into parts may take into account the parsing of the text such that the patient cannot determine the meaning of the text simply from the first set of parts and the third set of parts, or from the second set of parts and the third set of parts.

A function may be applied to determine which part is added to which set during step 620. In one example, the parts may be classified in each set such that each part of a given set is neighboured by parts of one or two different sets.

With an appropriate part size that can be set by the subject, a supervising physician and/or through the use of the coarseness adjustment module 230, the text classification module 210 then establishes which part will be attributed to which set (i.e. which parts will be subject to the first effect, the equivalent second effect, or not subject to any effect, thereby falling into the third set). The classification of the parts into the different sets will determine which parts of the text are seen by each eye, as the first set of parts is viewable by a different eye than the eye that can view the second set of parts. Therefore, the classification results in a fracturing of the text such that a patient benefitting from the parts available to a single eye cannot read the text or has difficulty reading the text.

In some examples, the alternation between the parts of the three sets of parts may depend on the dichoptic scale. For instance, when the dichoptic scale is set at a word being the designated unit, a first word of each line may be of the third set of parts (to be presented to both eyes), and the remaining words may be assigned randomly to the first set of parts and the second set of parts at a given probability level (which could also evolve over the course of treatment). In an example where the dichoptic scale is set a letter being the designated unit, the first and last letter of each word may be part of the third set of parts to be presented to both eyes, to help alignment, and the remaining letters assigned randomly to the first set of parts and the second set of parts, with a given probability distribution (in some embodiments, a probability of 0% assigned to the third set of parts may be considered).

A first effect is applied to the first set of parts at step 630 such that the first set of parts is adapted to only be viewed by the first eye of the subject.

The first effect and the second effect may be used in combination with a lenticular means to restrict the first set of parts to be viewed by a first eye and to restrict the second set of parts to be viewed by a second eye.

A second effect is applied to the second set of parts at step 640 such that the second set of parts is adapted to only be viewed by the second eye of the subject.

The first effect and the second effect may be used in combination with a lenticular means to restrict the first set of parts to be viewed by a first eye and to restrict the second set of parts to be viewed by a second eye.

In some examples, the first effect may be to colour-code the parts of a first set of parts using a first colour and to colour-code using a second colour the second set of parts. The use of anaglyphic glasses by the subject, complementary with the first colour and the second colour, results in the subject only capable of viewing the first set of parts using the subject's first eye, the second set of parts being imperceptible by the first eye due to the colour of the lens of the anaglyphic glasses masking the parts in the same colour as that of the lens. The subject is also enabled to only view the second set of parts using the subject's second eye, the first set of parts being similarly imperceptible by the second eye due to the colour of the lens of the anaglyphic glasses. The third set of parts is in a third colour, different from the first colour and the second colour (e.g. black, dark grey). As a result, the third set of parts can be perceived by both the first eye and the second eye of the subject, despite the use of the anaglyphic glasses.

In another example, the light corresponding to the first set of parts may be polarized in a first direction, and the light corresponding to the second set of parts may be polarized in a second direction different from the first (e.g. orthogonal to the first). The subject uses a pair of polarized glasses, where a first lens only permits light to pass that is oriented in the first direction, and where the second lens only permits light to pass that is oriented in the second direction. The light corresponding to the third set of parts contains light that is oriented in the first direction and the second direction, thereby visible through both lens of the polarized glasses. As a result, the subject may see the first set of parts and the third set of parts with the first eye, and may see the second set of parts and the third set of parts with the second eye.

In one embodiment, the light corresponding to the first set of parts may be of a first wavelength, and the light corresponding to the second set of parts may be polarized of a second wavelength different from the first wavelength. The subject uses a pair of dichroic glasses, where a first lens include a filter to discriminate based on first set of wavelengths, and where the second lens include a filter to discriminate based on second set of wavelengths. The light corresponding to the third set of parts is at a wavelength that can be perceived by both eyes. As a result, the subject may see the first set of parts and the third set of parts with the first eye, and may see the second set of parts and the third set of parts with the second eye.

In another example, a segregation to the first eye and the second eye may be achieved through a lenticular means, where light of the first set of parts is directed to a first eye, and light from the second set of parts is directed to the other. Light from the third set of parts is directed to both eyes.

In another embodiment, the first effect and the second equivalent effect may be to assign the first set of parts to be viewed on a first screen, to be presented to a first eye of the subject, and to the assign the second set of parts to be viewed on a second screen, to be viewed by a second eye of the subject. The third set of parts is assigned to be viewed on the first screen and the second screen, such that the third set of parts can be viewed by both eyes of the subject. This particular example can be used in the context of when the adapted text is presented on a virtual-reality display including two screens, one for each eye of the subject.

Figure 7:
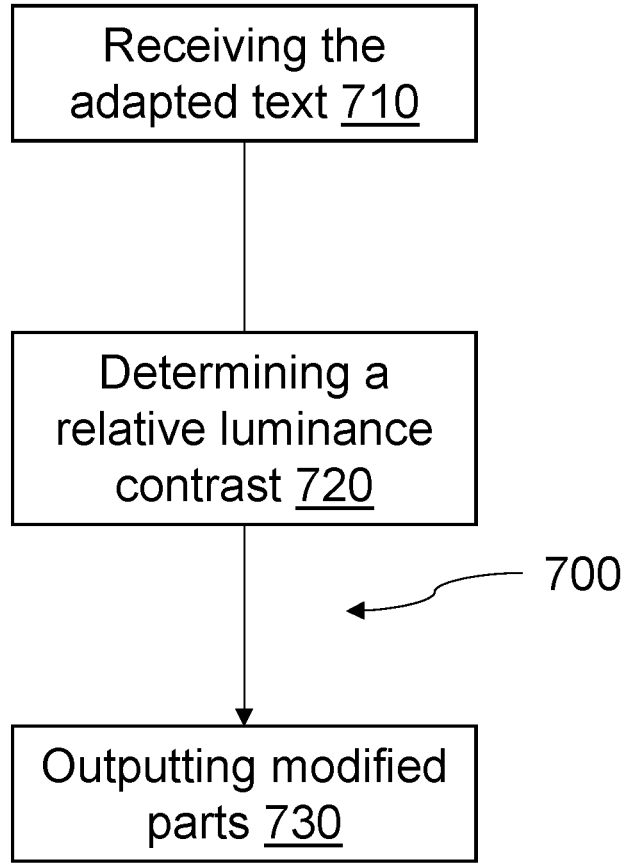
FIG. 7 is a flowchart diagram of an exemplary method of setting a relative luminance contrast between a first set of part, a second set of parts of a text and a third set of parts of text.

The parts classified into the three sets, forming the text, and then further adapted with the first effect and the second effect, is then outputted at step 650. The part classification module 210 then calls the luminance contrast module 220. Exemplary Method of Determining a Relative Luminance Contrast Between the First Set of Parts and the Second Set of Parts:

Reference is now made to FIG. 7, illustrating an exemplary method 700 of determining a relative luminance contrast between the first set of parts and the second set of parts, where a selected relative luminance contrast triggers binocular vision for the subject, as performed by the luminance contrast module. For purposes of illustration, reference will be made to luminance contrast module 220 and to text adaptation software architecture 200. However, it will be understood that any luminance contrast module and text adaptation software architecture in accordance with the present teachings may be used.

The adapted and classified text is received at step 710 from the text classification module 210.

A relative luminance contrast between the first set of parts, the second set of parts and the third set of parts is determined at step 720. A luminance contrast is set for the first set of parts, a luminance contrast is set for the second set of parts and a luminance contrast is set for the third set of parts, resulting in an initial relative luminance contrast. The relative luminance contrast is then adjusted until the subject is capable of perceiving the three sets of parts. The relative luminance contrast can be adjusted by increasing or decreasing the luminance contrast of the first set of parts or by increasing or decreasing the luminance contrast of the second set of parts or by increasing or decreasing the luminance contrast of the third set of parts. The luminance contrast can be adjusted by increasing or decreasing the luminance of the parts. The luminance contrast can be adjusted by increasing or decreasing the luminance of the background, or of a portion of the background that surrounds the first set of parts or the second set of parts or the third set of parts (e.g. by adjusting the luminance of the pixels surrounding the parts of the set of parts).

The set of characters are presented on a light background (e.g. white background, light grey background, light-coloured background, etc.) in order to enable the parts of the text to contrast with the background, and for improving the adjustment of the luminance contrast. The light background is for purposes of achieving achromatic contrast, devoid of significant chromatic contrast.

The subject may be asked to provide feedback, e.g., using the user input interface 103, to indicate when the subject is perceiving the entire text, thereby indicating that the subject is seeing binocularly. The relative luminance contrast may be gradually adjusted (e.g. increased) until the subject provides input that the subject is seeing binocularly. In order to confirm that the relative luminance contrast is not too elevated, a decrease in the relative luminance contrast may also be performed until the subject loses binocular vision, thereby indicated that the previous value, prior to loss of binocular vision, was the closest increment required to enable the subject to gain binocular vision. Adjusting the relative luminance contrast of one set of parts, and then the other sets of parts, can further confirm the relative strength of one eye with respect to the other.

The adaptation of the first set of parts, the second set of parts and the third set of parts by adjusting a relative luminance contrast between the two compensates for the strength of one eye with respect to the other. This compensates for any resident neural imbalance between the eyes of a patient thereby ensuring that the dichoptic information presented within the therapy will be comparable at the point of combination of the two eyes input in the brain.

The luminance contrast of the set of parts presented to a weak eye is greater than the luminance contrast of the set of parts presented to a dominant eye during treatment. The third set of parts, adapted to be presented to both eyes, may have a luminance contrast that is equal to the luminance contrast of the parts presented to the weak eye. In some examples, the luminance contrast of the third set of parts may be adapted to differ between its presentation to the weak eye and its presentation to the dominant eye. The luminance contrast of the third set of parts presented to the weak eye may be equivalent to the luminance contrast of the set of parts presented to the weak eye, and the luminance contrast of the third set of parts presented to the weak eye may be equivalent to the luminance contrast of the set of parts presented to the weak eye.

FIG. 3B illustrates examples of different relative luminance contrasts between the first set of parts, the second set of parts and the third set of parts. Example A shows a text where the relative luminance contrast is set at "1", where the luminance contrast between the first set of parts, the second set of parts and the third set of parts is equivalent. Example B shows a luminance contrast for the third set of parts and the set of parts for presentation to the weak eye being greater than the luminance contrast of the set of parts for presentation to the dominant eye. Example C shows a luminance contrast for the set of parts for presentation to the weak eye being greater than the luminance contrast of the set of parts for presentation to the dominant eye and the luminance contrast of the third set of parts (for presentation to both eyes).

The modified sets of parts, with adjusted luminance contrast, is then outputted at step 730. A text generation module 440 is called.

As the subject's binocular function improves through the use of system 100, the luminance contrast module 220 may be called periodically to re-evaluate the relative luminance contrast between the first set of parts and the second set of parts. A reduced relative luminance contrast can then be set to further challenge the subject as the subject's binocular function improves. When the subject's binocular function has been fully restored, the relative luminance contrast may be set to "1", indicative of no difference in relative luminance contrast between the first set of parts and the second set of parts.

Figure 8:
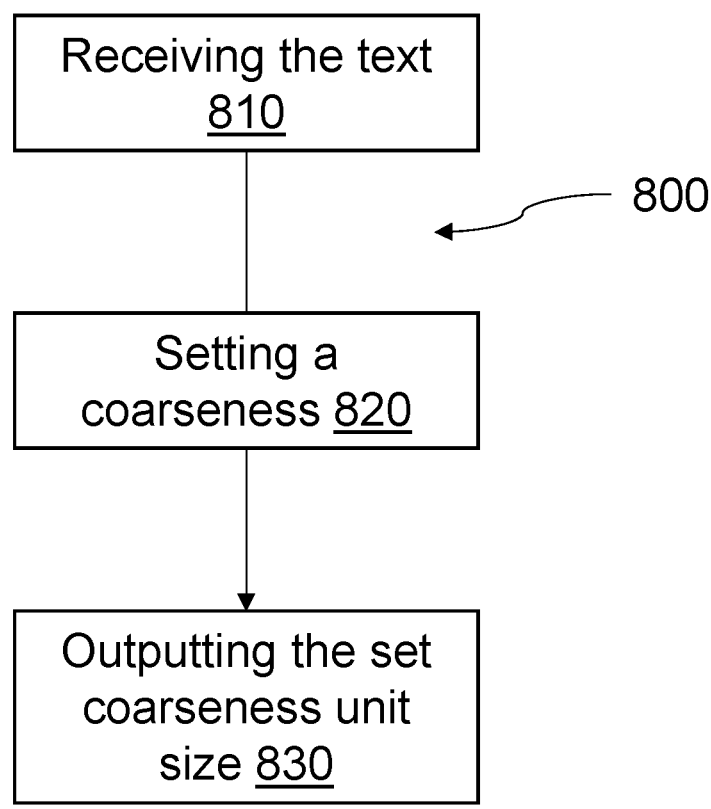
FIG. 8 is a flowchart diagram of an exemplary method of setting a coarseness of separation of the first set of parts, the second set of parts and the third set of parts of a text.

Exemplary Method of Setting a Dichoptic Scale by Adjusting Coarseness of Separation for Adapting a Text for Treating a Visual Disorder Affecting Binocular Vision:

Reference is now made to FIG. 8, illustrating an exemplary method 800 of setting dichoptic scale by adjusting a coarseness of separation of the parts of a text to be adapted for treating a visual disorder affecting binocular vision, as performed by the coarseness adjustment module. For purposes of illustration, reference will be made to the coarseness adjustment module 230 and to text adaptation software architecture 200. However, it will be understood that any coarseness separation module and/or text adaptation software architecture in accordance with the present teachings may be used.

In some examples, for the purpose of classifying the text into three sets of parts at step 620, the coarseness adjustment module 230 may be called, where its program code causes the processor 101 to perform the method 800.

In some embodiments, in addition to or instead of the determining and setting of a relative luminance contrast between the first set of parts and the second set of parts as described in method 700, adjusting the coarseness of separation between the parts may be achieved to enable the subject to read the entire text and see binocularly.

By coarseness of separation, it is meant the size of the parts of a set of parts that interchange with the parts of the other sets to constitute the text. As each part of a set of parts may be neighboured by parts of one or more different sets of parts, and where a text is composed of parts of each set of parts, the coarseness of separation of the parts is related to the amount of text information that is being presented consecutively to the user from a single set of parts, before being followed by text information from a different set of parts which may be perceived by the user as a blank on the page if the user is not seeing binocularly. Larger parts of the text signify that the subject will be able to discern greater portions of consecutive text that are available to be viewed by a single eye. For instance, when the parts have an elevated coarseness, a single part-unit of a set of parts may be a group of words. Therefore, with the coarseness of separation being set as a "group of words" the subject may see a group of consecutive words from a first set of parts, followed by a group of consecutive words by a second set of parts only if both eyes are functioning binocularly.

A subject with a more severe visual disorder affecting binocular vision may be able to perceive binocularly an entire text only with a coarser separation, but may fail to achieve binocular function where the parts of the text are separated with a finer amount of separation.

Therefore, when the text is received by the coarseness adjustment module 230 at step 810, a coarseness of separation of the parts of the text is then determined at step 820. Step 820 may be performed in combination with step 620. Step 620 may establish a function to determine the pattern of alternation between the first set of parts, the second set of parts and the third set of parts. At step 820, selecting the appropriate coarseness of separation may be performed iteratively, from greater to smaller, or vice-versa. When the measure of coarseness of separation has been selected, steps 620-650, and in some examples, steps 910-920, may be performed, such that the parts of the text can then be classified into the three sets, the first effect and second equivalent effect of steps 630-640 applied, and generated for viewing by the subject to test that the selected size of coarseness of separation is appropriate.

The coarseness separation module 230 may then receive feedback from the user as to the user's being able to read the entire text, thereby benefitting from binocular vision with the current settings. The input provided by the user can then be used to refine the selection of the appropriate size of the coarseness of separation. For instance, if the subject is indicating that they are viewing binocularly at a given coarseness of separation size, the coarseness adjustment module 230 may output a smaller size for coarseness separation, and determine if the user is still viewing binocularly. On the other hand, if the user is not seeing binocularly, and cannot read the entire text, the coarseness adjustment module 230 may instead output a larger size of coarseness separation, and query the subject as to the subject's ability to see the entire text, indicative of binocular vision. Steps 620-650 and 910-920 may be repeated cyclically, triggered at step 820, until an appropriate size of coarseness of separation has been selected (e.g. the smallest size of coarseness of separation necessary to enable the user to see the entire text, thereby viewing binocularly).

In some examples, an exemplary ranking of changes in the size of coarseness of separation, from a larger size to a smaller size, may include one or more of the following: "a group of words"; "a word"; "a group of characters"; "a character"; "a fragment of a character".

Figure 5:
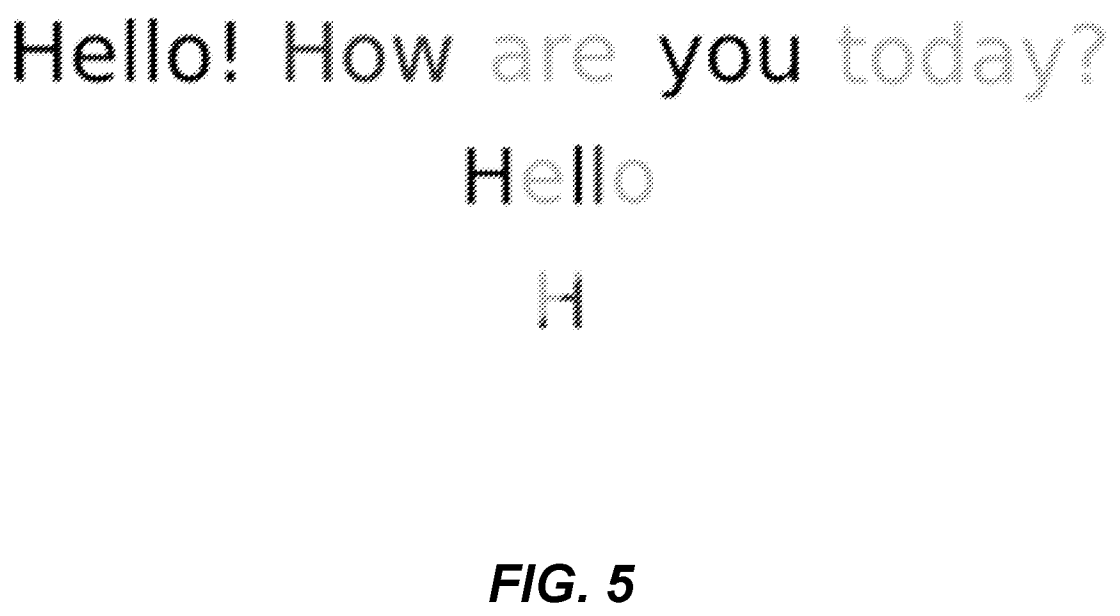

An example of different sizes of coarseness separation is illustrated in FIG. 5, where the top row shows a larger size of coarseness separation, and the lowest row shows a smaller size of coarseness separation. The first row shows the size of coarseness of separation set at "a word". The second row, under the first row, shows the size of coarseness of separation set at "a character". The third and bottom row, shows the size of coarseness of separation set at "a fragment of a character".

When the size of coarseness of separation is set at the level of "a fragment of a character", the characters may be fragmented in such a way as to not let the subject guess the entire character based upon the information available to one eye through the fragments presented as either the first set of parts or the second set of parts. In some examples, the size of the coarseness of separation may vary by sets of parts. For instance, the first set of parts and the second set of parts may have a different coarseness of separation from the third set of parts. As an example, the first set of parts and the second set of parts may have size of coarseness of separation set at "a fragment of a character", where the third set of parts, common to both eyes, may have its size of coarseness separation set at "a character".

Figure 3A:
FIG. 3A is a drawing of a display presenting an exemplary text where its characters have been adapted for presentation of a first set of characters to a first eye, of a second set of characters to a second eye, and of third set of characters to both eyes.

In other examples, the size of coarseness of separation may instead be a range of possible sizes (e.g. one or more characters). This is illustrated in FIG. 3A, where the size of the coarseness of separation is "one or more characters" where some of the parts are shown to constitute a single character, where other parts constitute multiple characters.

Once the size of coarseness of separation has been set, the value of the set size of coarseness of separation is transmitted to the part classification 210 at step 830, and the part classification module 210 is called to classify the text into the three sets of parts based on the set size of coarseness of separation that has been determined by performing method 800, at step 620.

As the subject's binocular function improves through the use of system 100, the coarseness separation module 230 may be called periodically to re-evaluate the set size of coarseness of separation. A smaller size of coarseness of separation can then be set to further challenge the subject as the subject's binocular function improves.

In some embodiments, the size and/or the font of the characters may also be adjusted by the coarseness adjustment module 230, in an iterative fashion, cycling through steps 620-650 and 910-920 as explained with regard to step 810. A larger font size may be favoured for a subject with a more severe loss of binocular function be it sensory or motor, and a smaller font size may be favoured for a subject with a less severe loss of binocular function, be it sensory or motor.

Figure 10:
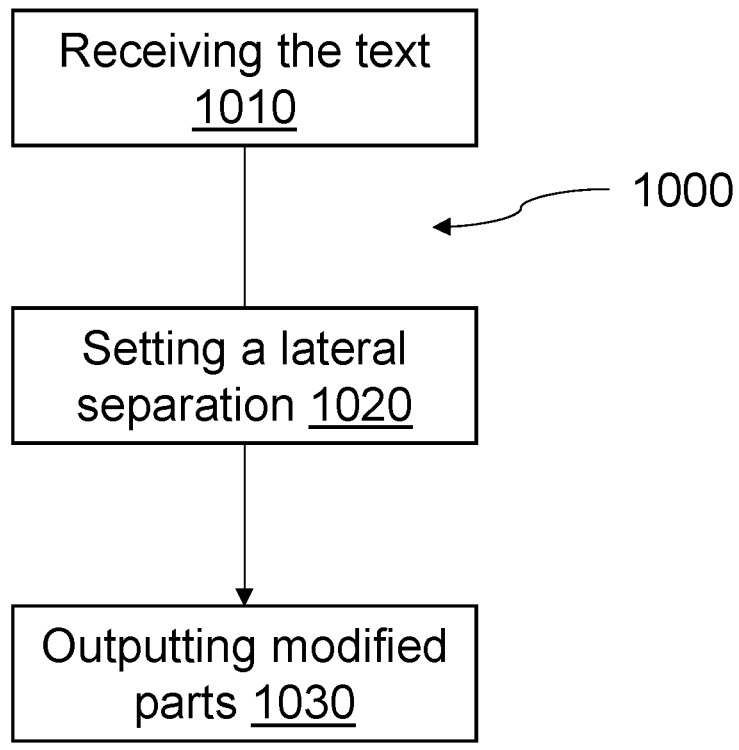
FIG. 10 is a flowchart diagram of an exemplary method of setting a lateral separation of the first set of parts, the second set of parts and the third set of parts of a text.

Exemplary Method of Adjusting a Lateral Separation Between Parts or Characters of a Text:

Reference is now made to FIG. 10, illustrating an exemplary method 1000 of setting a lateral separation of at least the third set of parts (adapted to be visible by both eyes of the subject) of a text for improving motor or sensory-related binocular function (e.g. which has been hampered by a convergence insufficiency disorder).

A lateral separation of the parts (or characters, or words) of the text which allows the text to be perceived either in front or behind the digital display (thereby initiating reflex convergence to a closer point in the former case or a point further away in the latter case) may be adjusted for treating a subject with a convergence insufficiency/excess disorder. Convergence insufficiency disorder impacts how a subject's eyes work in tandem with aligning on a nearby object, where the eyes may over-converge or under-converge.

The lateral separation is the lateral or horizontal disparity between the third set of parts of the text that are seen by both eyes of the subject. The text from the first set of parts and those from the second set of parts may be perceived to be at the same depth by the subject, or between characters of the text, or between words of the text. Changing the lateral separation is to produce binocular disparity in the text such that the text will be perceived to be located in front or behind the plane of digital display, thereby initiating greater or less convergence of the eyes relative to that of the plane of the digital display. A change in the lateral separation may be generated by increasing or decreasing the horizontal distance between the parts of the text (or parts of the third set of parts). In some instances, a change in the eyes' convergence may be achieved by increasing or decreasing the viewing distance of the substrate on which the text is displayed (e.g. the display screen, the paper, etc.), thereby causing the eyes to increase or decrease their convergence.

In some instances, the lateral separation may be set between characters of the text. In some instances, the lateral separation may be set between words of the text.

The text is received at step 1010. The text may be the text outputted by applying exemplary method 600 or following exemplary method 700, or following an application of method 800.

A lateral separation of the parts, the characters or the words of the text is then set, or a change of lateral separation of the parts, characters, or words of the text is set, at step 1020 for the text. In one example, the change in the lateral separation may be generated by increasing or decreasing the horizontal distance between the parts of the text (or parts from the third set of parts). The coarseness of separation may be gradually adjusted over time for a subject (e.g. repeatedly, after passing of a period of time, the coarseness of separation may be increased or decreased). In some instances, the coarseness of separation may be continuously varied (by cyclical increasing and decreasing of the coarseness of separation) as the subject reads the text.

In some instances, the changing of the position of the lateral separation of the parts of the text may result in changing of the position of the one or more parts (e.g. the character(s)) within a word.

In some instances, the lateral separation between the parts of the first set of parts and/or the second set of parts may also be adjusted.

In some instances, the lateral separation of the text may be adjusted following receipt of user input (e.g. feedback), e.g., regarding an improvement of binocular function of the subject (i.e. the subject has reduced over-converging or under-converging). In some instances, an eye tracker may be used to monitor eye movement, the data generated by the eye tracker may be analyzed to indicate if the eyes of the subject are converging properly.

The lateral separation of the text may be adjusted in accordance with information received from the eye tracker (e.g. if the subject is responding to rehabilitation caused by adjusting the lateral separation of the text, as determined from the information generated by the eye tracker).

The modified parts, with the adjusted lateral separation between the parts, characters or words of the text, is outputted at step 1030.

Figure 9:
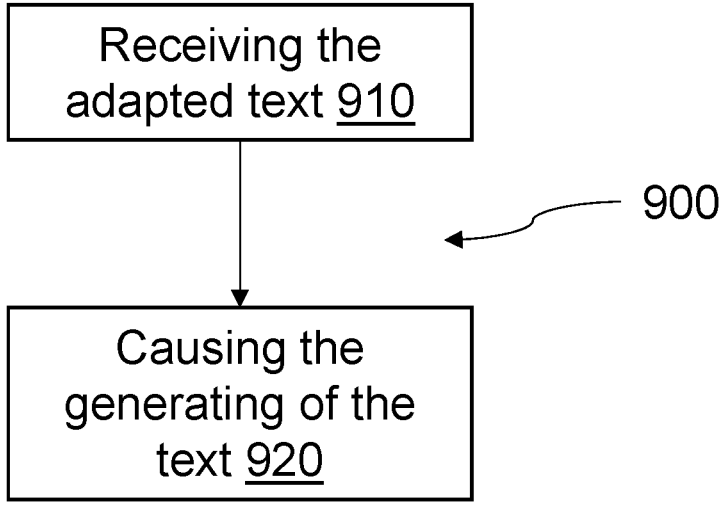
FIG. 9 is a flowchart diagram of an exemplary method of causing a generating of a text that has been adapted such that a first set of characters is presentable to a first eye, a second set of characters is presentable to a second eye, and third set of characters is presentable to both eyes.

Exemplary Method of Generating the Adapted Text for Treating the Visual Disorder Affecting Binocular Function:

Reference is now made to FIG. 9, illustrating an exemplary method 900 of generating the text that has been adapted for improving binocular function, as performed by the text generation module. For purposes of illustration, reference will be made to the text generation module 240 and to text adaptation software architecture 200. However, it will be understood that any text generation module and/or text adaptation software architecture in accordance with the present teachings may be used.

The text generation module 240 receives the adapted text, and the information of same, from the luminance contrast module 230, if a relative luminance contrast was determined and set, or from the text classification module 210, if no relative luminance contrast was set, at step 910.

The text generation module 240 then generates commands for causing the generating of the adapted text at step 920. Such commands may be, for instance, the application of a filter over the text generated by an application program with the necessary first effect, second effect, and optionally relative luminance contrast, as determined (as in the case when the text adaptation software architecture 200 functions as an add-on for an application program running on the computer, such as a videogame, a web browser, etc.). In some cases, when the text adaptation software architecture 200 is an application program that generates text or is integrated into an application program that generates text, the text generation module 920 may generate on the display of the computer that has been adapted through method 600, and method 700, method 800 or method 1000. In some examples, step 920 may also include a command for printing the adapted text onto stationery.

For instance, FIG. 3A is an example of a text illustrating a first set of parts that have the effect of being in one colour, and the second set of parts being in a second colour. The third set of parts remains in black. The size of the coarseness of separation is characters or groups of characters (e.g. a range of one to several characters). Although not visible in FIG. 3A, a relative luminance contrast has been set between the three sets of parts.

Figure 4:
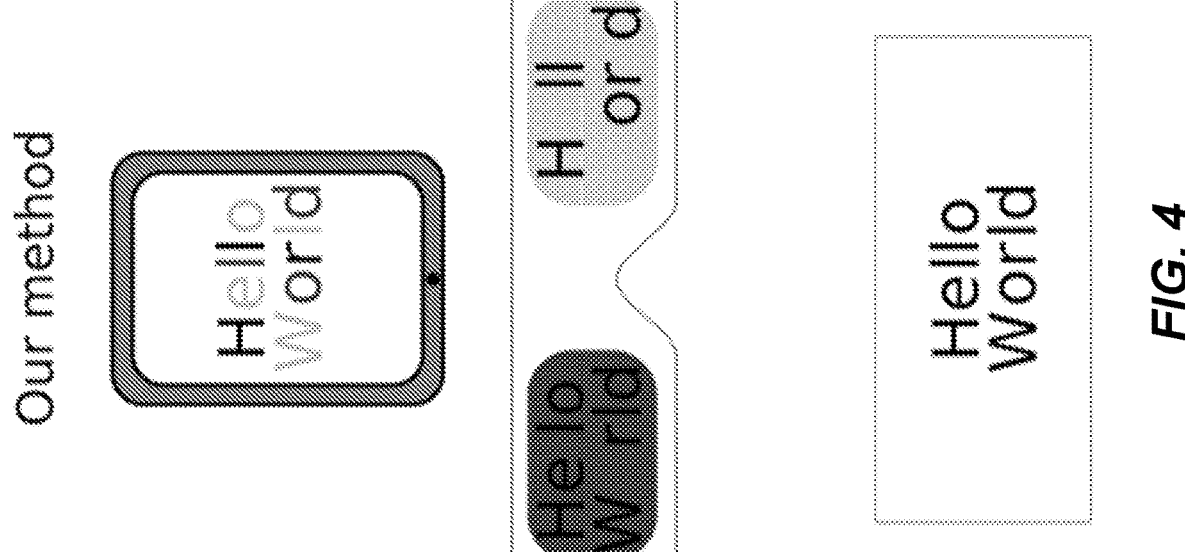
FIG. 4 is a drawing of an exemplary text where its characters have been adapted for presentation of a first set of characters to a first eye, of a second set of characters to a second eye, and of a third set of characters to both eyes, and how the characters are perceived by each eye of the subject through the use of anaglyphic glasses.

As shown in FIG. 4, illustrating another example of a text that has been adapted for improving binocular function of a subject, the adapted text is shown on a tablet. Similar to FIG. 3A, an effect has been applied to the first set of parts to be in one colour, and an effect has been applied to the second set of parts to be in a second colour. The third set of parts remains in black. When the subject wears anaglyphic glasses, a first eye only perceives the first set of parts and the third set of parts (through the first lens) and the second set of parts only perceives the second set of parts and the third set of parts (through the second lens). Therefore, each eye only receives an incomplete portion of the text. However, when the subject views binocularly, as shown in the bottom of FIG. 4, the user may perceive the entirety of the text. The binocular vision can be achieved by determining a relative optical contrast between the first set of parts and the second set of parts and the third set of parts that triggers binocular vision, and/or by selecting an appropriate size of coarseness separation between the parts of the different sets of parts that results in binocular vision.

In some instances, an eye tracker may be provided to monitor eye movement of the subject. The information generated by the eye tracker on the subject's eye movement may be analyzed to determine if the subject's eyes are working binocularly (such as by determining a reading speed of the text by the subject, by tracking the movement of the eyes of the subject across the screen or page). The information generated by the eye tracker may be used to further determine a state of rehabilitation of the subject, where further adjustments to the text may occur to further challenge the subject (e.g. reducing relative luminance contrast, decreasing the dichoptic scale of the parts of the text), or to further assist the subject in achieving binocular function (e.g. increasing relative luminance contrast, increasing the dichoptic scale of the parts of the text).

In some instances, the parts of the text that are dedicated to respectively the first set of parts, the second set of parts and the third set of parts may change or switch (e.g. be adjusted dynamically) between frames of an image stream displaying the text. For instance, in one example where the text includes the word "elephant", in a first frame of an image stream, "el" and "ph" may be in the first set of parts, "e" following the letter I and "nt" may be in the second set of parts, and "a" may be in the third set of parts. In the second frame of the image stream, "e" following the letter I and "nt" may be in the first set of parts, "el" and "a" may be in the second set of parts, and "ph" may be in the third set of parts. In some instances, the assignment of the parts of the text to the first set of parts, the second set of parts, and the third set of parts may remain unchanged between the frames of an image stream.

In some instances, the text as described herein may be presented in an image stream, or one or more images (static images).

In some instances, the image stream may be that of a movie where the text is the subtitles, a videogame displaying the text (e.g. showing instructions required to play the game, dialogue between characters of the videogame, etc.), an online video where at least part of the information is displayed in text form, a video-based commercial, etc.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A method of adapting a text for viewing in digital or printed form for improving motor or sensory-related binocular function, the text comprising a string of characters, comprising:
   converting or classifying the string of characters into a first set of parts, a second set of parts that is different from the first set of parts, and a third set of parts that is different from the first set of parts and the second set of parts;
   adapting the string of characters into one or two dichoptic display strings configured to present the first set of parts to a first eye of the subject and not a second eye of the subject, to present the second set of parts to the second eye of the subject and not to the first eye of the subject, and to present the third set of parts to both the first eye and the second eye; and
   causing a setting of a relative luminance contrast between the first set of parts, the second set of parts and the third set of parts for allowing the subject, wherein the relative luminance contrast is a difference in luminance contrast between the first set of parts, the second set of parts and the third set of parts, wherein the luminance contrast of the first set of parts, the second set of parts and the third set of parts is a luminance decrement of the first set of parts, the second set of parts or the third set of parts, respectively, with respect to a luminance of a background that surrounds the first set of parts, the second set of parts or the third set of parts, to perceive the first set of parts using the first eye and perceive the second set of parts using the second eye, and the third set of parts with the first eye and the second eye, whereby the subject can read the text binocularly and whereby the reading of the text, perceiving the first set of parts, second set of parts and third set of parts, improves a visual disorder.

2. The method as defined in claim 1, wherein the text is generated on a flat display of the computer.

3. The method as defined in claim 1, wherein the adapting is the result of the use of anaglyph images, wherein the first set of parts is in a first colour and the second set of parts is in a second colour, and whereby the first eye of the user is presented with a filter for the first colour enabling the first set of parts to be presented to the first eye of the subject, and the second eye of the user is presented with a filter for the second colour enabling the second set of parts to be presented to the second eye of the subject, such that the user does not perceive a difference in colour in the string of characters while reading the text.

4. The method as defined in claim 1, wherein the background is white to allow the adjustment of the relative luminance contrast.

5. The method as defined in claim 1, wherein the improving of the binocular function of the subject is to treat amblyopia.

6. The method as defined in claim 1, wherein the improving of the binocular function of the subject is to treat dissociated visual disorder or visual disorder as a result of head or eye trauma.

7. The method as defined in claim 1, further comprising:
   receiving the text for display on the computer; and
   generating the one or two dichoptic string displays on one or two computer displays.

8. The method as defined in claim 7, wherein the converting or classifying comprises performing optical character recognition on the text to identify the string of characters prior to the adapting.

9. The method as defined in claim 7, wherein the received text is for display in a video game.

10. The method as defined in claim 7, wherein the received text is for display as a digital book.

11. The method as defined in claim 1, wherein the text is printed on stationery.

12. The method as defined in claim 1, wherein the causing a setting of a relative contrast between the first set of parts and the second set of parts and the third set of parts is performed by adjusting pixels of the background surrounding the first set of parts and the second set of parts and the third set of parts.

13. The method as defined in claim 1, wherein the causing a setting of a relative contrast between the first set of parts and the second set of parts and third set of parts is performed by modifying contrast of only one, two or the three sets of parts with respect to the background.

14. The method as defined in claim 1, wherein the adapting is achieved through polarization such that light associated with the first set of parts is restricted to a first direction, and light associated with the second set of parts is restricted to a second direction.

15. The method as defined in claim 1, wherein the parts of the first set of parts are characters, the parts of the second set of parts are characters, and the parts of the third set of parts are characters.

16. The method as defined in claim 1, wherein the parts of the first set of parts are words, the parts of the second set of parts are words, and the parts of the third set of parts are words.

17. The method as defined in claim 1, wherein the parts of the first set of parts are portions of words or characters, the parts of the second set of parts are portions of words or characters, and the parts of the third set of parts are portions of words or characters.

18. The method as defined in claim 1, further comprising:
adjusting a dichoptic scale by decreasing coarseness of separation between the interchanging of the first set of parts, the second set of parts and the third set of parts by having the parts of the first set of parts, the second set of parts, and the third set of parts transition from words to characters and to fragments of characters as the visual disorder of the subject improves.

19. A system for adapting a text for viewing in digital or printed form for improving motor or sensory-related binocular function, the text comprising a string of characters, the system comprising:
a processor;
memory including program code that, when executed by the processor, cause the processor to:
    convert or classify the string of characters into a first set of parts, a second set of parts that is different from the first set of parts, and a third set of parts that is different from the first set of parts and the second set of parts;
    adapt the string of characters into one or two dichoptic display strings configured to present the first set of parts to a first eye of the subject and not a second eye of the subject, to present the second set of parts to the second eye of the subject and not to the first eye of the subject, and to present the third set of parts to both the first eye and the second eye; and
cause a setting of a relative luminance contrast between the first set of parts, the second set of parts and the third set of parts for allowing the subject to perceive the first set of parts using the first eye and perceive the second set of parts using the second eye, and the third set of parts with the first eye and the second eye, wherein the relative luminance contrast is a difference in luminance contrast between the first set of parts, the second set of parts and the third set of parts, wherein the luminance contrast of the first set of parts, the second set of parts and the third set of parts is a luminance decrement of the first set of parts, the second set of parts or the third set of parts, respectively, with respect to a luminance of a background that surrounds the first set of parts, the second set of parts or the third set of parts, whereby the subject can read the text binocularly.

20. A non-transitory storage medium comprising program code that are executable by a processor to:
convert or classify the string of characters into a first set of parts, a second set of parts that is different from the first set of parts, and a third set of parts that is different from the first set of parts and the second set of parts;
adapt the string of characters into one or two dichoptic display strings configured to present the first set of parts to a first eye of the subject and not a second eye of the subject, to present the second set of parts to the second eye of the subject and not to the first eye of the subject, and to present the third set of parts to both the first eye and the second eye; and
cause a setting of a relative luminance contrast between the first set of parts, the second set of parts and the third set of parts for allowing the subject to perceive the first set of parts using the first eye and perceive the second set of parts using the second eye, and the third set of parts by both eyes, and the third set of parts with the first eye and the second eye, wherein the relative luminance contrast is a difference in luminance contrast between the first set of parts, the second set of parts and the third set of parts, wherein the luminance contrast of the first set of parts, the second set of parts and the third set of parts is a luminance decrement of the first set of parts, the second set of parts or the third set of parts, respectively, with respect to a luminance of a background that surrounds the first set of parts, the second set of parts or the third set of parts, whereby the subject can read the text binocularly.

* * * * *